Aug. 6, 1940.   R. WHITE   2,210,610
PHOTOGRAPHIC CAMERA FOR MAKING SYSTEMATIC IDENTIFICATION OF NEGATIVES
Filed June 10, 1937   2 Sheets-Sheet 1
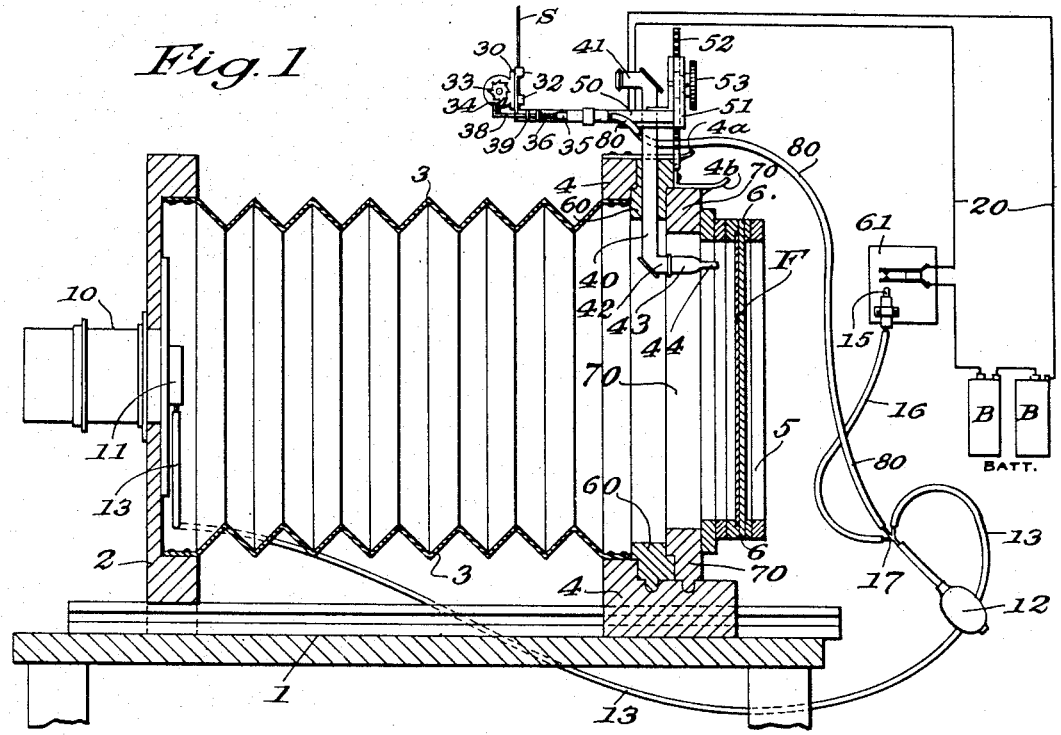
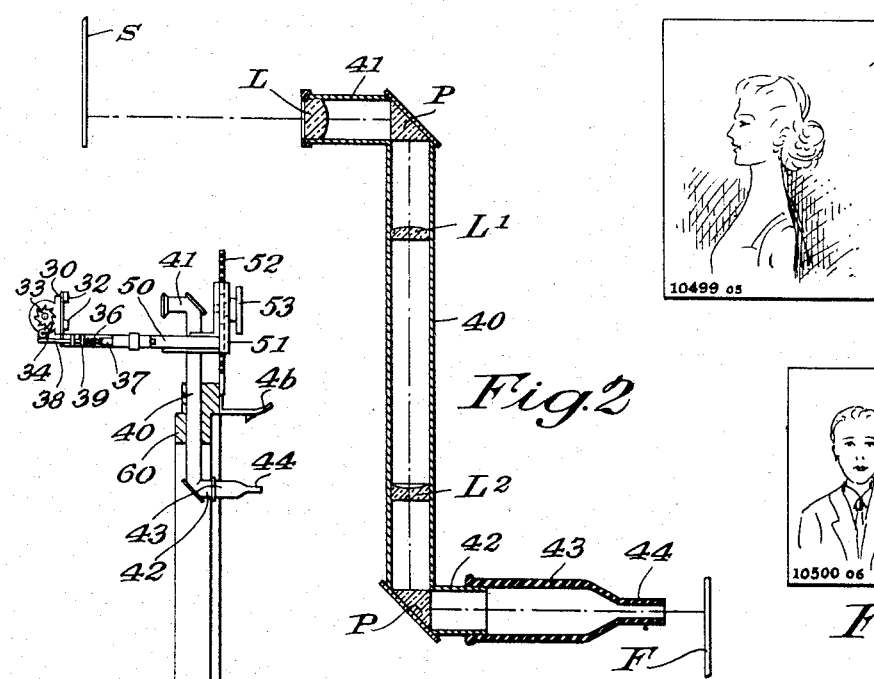
INVENTOR:
Raeburn White
BY Spear Rawlings & Spear
ATTORNEYS.

Aug. 6, 1940.  R. WHITE  2,210,610
PHOTOGRAPHIC CAMERA FOR MAKING SYSTEMATIC IDENTIFICATION OF NEGATIVES
Filed June 10, 1937  2 Sheets-Sheet 2

INVENTOR:
Raeburn White
BY Spear Rawlings & Spear
ATTORNEYS.

Patented Aug. 6, 1940

2,210,610

UNITED STATES PATENT OFFICE 2,210,610

PHOTOGRAPHIC CAMERA FOR MAKING SYSTEMATIC IDENTIFICATION OF NEGATIVES

Raeburn White, Boston, Mass., assignor of one-half to Warren K. Vantine, Newton, Mass.

Application June 10, 1937, Serial No. 147,499

2 Claims. (Cl. 95—1.1)

In the production of photographic negatives, it has become increasingly important for varied uses to provide definite concurrently made identification.

Where a large number of negatives are taken or produced, their identity has usually been established by a manual or like record system in which identification is made after the negative has been developed or printed or taken to the dark room and numbered before developing.

My present invention provides for an immediate basis of identification made as an integral part of any negative and definitely available for present or future identification according to any desired recording system of which it automatically becomes a part. It is self-perpetuating not only throughout its own life but in whatever prints or other reproductions are made from it.

As illustrative of my invention and the practices thereunder, I will describe characteristic equipment in connection with photographic portraiture as practiced on any considerable scale. It will be understood, of course, that such an example and explanation of its details is not to be taken as limiting, but as giving definite practical instruction in a particular field of usefulness. It affords an excellent example because it represents characteristic problems and their solution in that well known field so that my teachings are thus made directly available for adoption and profitable enjoyment by others. Their adaptation to the various related fields of photography will be immediately apparent to those familiar with the needs and detail of each business in such fields.

In the accompanying drawings I have indicated certain equipment and the methodical use thereof as applied in the particular field selected for illustration.

In these drawings:

Fig. 1 shows a partially sectional view of an indicated camera equipped according to my invention.

Fig. 2 is a diagrammatic indication of the auxiliary exposure system.

Fig. 3 is a view indicating an actuating device for auxiliary or serial identification as disposed at the camera back and also showing a simple basis of vertical adjustment for change of negative size.

Fig. 4 illustrates one size of negative produced according to my invention.

Fig. 5 is a corresponding view where the negative is used for two exposures.

Figures 6, 7:
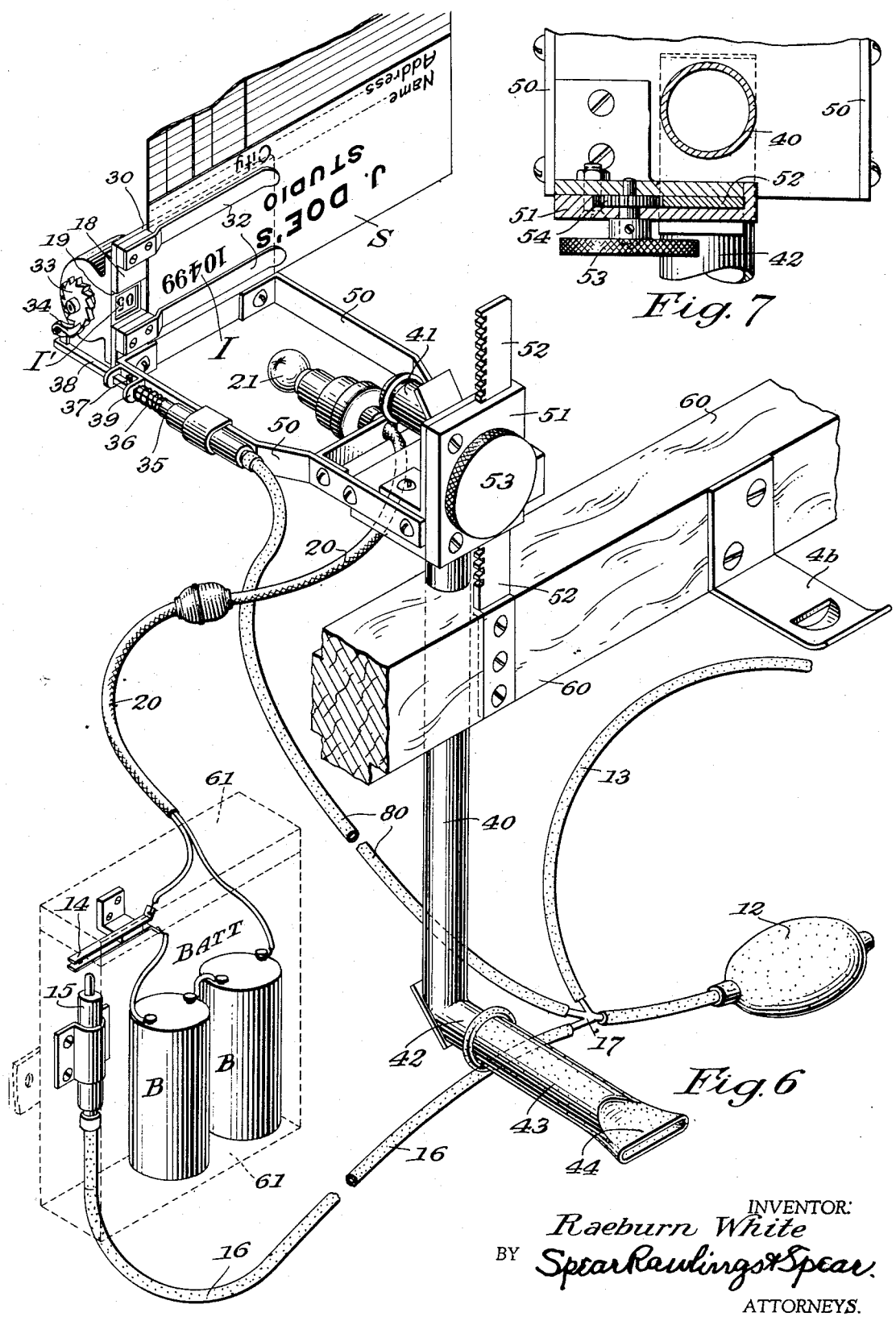
Fig. 6 is an enlarged fragmentary view as at the upper portion of the rear of an indicated camera so equipped as from the right of Fig. 1.
Fig. 7 is a sectional view showing the pinion and rack construction.

The camera shown in the accompanying drawings is of the portrait type. My invention may be applied to any type of camera but the regular studio equipment is in point in connection with the discussion of the selected example of practice according to my method.

Referring to Fig. 1 and to such parts as I have thought pertinent, I have shown a bed indicated generally at 1 and at 2 the usual front or lensboard supporting one end of the bellows 3 which is connected at its opposite end to a back frame 4.

In Fig. 3 I have shown a removable frame 60 separated to illustrate that this equipment can be removed from the camera as a unit and put on any other camera of the same make or style, or the camera used without the attachment.

The back frame of the camera 4 has a clip 4a which is a simple metal spring clip adapted to spring over the edge of the removable frame 60 when in place and yieldingly pressed against it. As shown in Fig. 1 I provide a second or follower frame 70 which is part of the plate holder 5 and is held by a clip 4b on the removable frame 60 that carries the secondary photographic system including the depending tubular casing 40. It is provided with a carriage 6 for a film F or plate in a holder 5, capable of being laterally shifted or otherwise set off where pictures of less than full holder size are to be made, as the so-called "two on" suggested in Fig. 5 in contrast with Fig. 4 which is intended to suggest the relative full size.

On the front 2 is indicated a lens mount 10 having a shutter control 11 worked by a hand bulb 12 on the control tube 13. At any convenient point I provide a switch 14 worked by a small piston 15 connected by the branch tube 16 to a triple coupler 17 connected in another branch to the shutter control 13.

The switch 14 is disposed so as to make or break the electrical connection in a circuit 20. In the circuit 20, preferably located at the top of the back frame 4, is a small light projector 21 of any desired form, but having a light bulb and focusing lens (not shown) and directing its beam on the identification holder 30. This holder 30 has a cover 18 apertured at 19 to expose supplementary identification indicia as indicated at $I^1$. These indicia are shown as numerals which are to be understood as part of the series $I^1$ used, for example, to supplement the series I of the system slips S forming part of the studio record of a new or former patron who has been booked for sittings as for the portrait work heretofore suggested. Such a slip S may be held by spring fingers 32 on the holder 30.

In a studio handling a considerable volume of business, the number of negatives exposed in a day's work may run into many hundreds, an actual instance cited being fifteen hundred, to illustrate the importance of negative identification in such a system. Such a system slip is usually filled in with the name and address of the patron, the character of portrait desired, the size, number and other details important to efficient and orderly business procedure.

Usually such a slip S is made out by an attendant at the booking desk or counter in the office or reception room. It is usually in triplicate, one for the office records and accounts, a second for a customer acknowledgment or receipt in case a deposit is required, while the third goes to the studio proper for assignment to the photographer who is to give the sitting and make the necessary negatives and/or proofs according to the organization and its routine.

The identification numerals as indicated at I with supplement I¹ if used, becomes the key not only to the immediate portrait order and its transaction, but by filing in any system is highly important on repeat or future orders for the finished pictures or repeat orders.

The difficulty, as first suggested, has been to provide reliable identification for each negative made. The need of such identification begins as soon as an exposure is made and in the past the filling of that need has been open to all the possibilities of human error at the camera, in the dark room or in printing the first proofs or prints.

As for the proofs are usually taken by or sent to the customer for selection for the preferred pose or size or other variant of the pictures desired, the negative has formerly had to be held in manually identified envelopes or like containers until final choice has been made and the unselected trial negatives disposed of.

As a means of carrying out my concept of integral negative identification I provide an auxiliary system such as indicated. As shown this consists of a tube or conductor casing 40. This has an objective end 41 disposed in focus on the area of the indicia I and I¹ when supported on the holder 30.

Its opposite or projecting end 42 is disposed opposite some selected spot in the plane occupied by the surface of the film or plate when in position for exposure. Such delivery or projecting end is usually disposed at the edge of the plate so as not to interfere with the actual picture being taken. In practice prints may be matted over or even trimmed off if undesired. The identification is actually so small and inconspicuously located on any print that it is wholly unobjectionable and, of course, its presence on any finished picture even though matted over is of permanent and continuing importance to both customer and studio in case a repeat or emergency publicity order is desired made from any favored negative.

In Fig. 2 I have indicated schematically the optics of such an auxiliary system for transmitting the identification image from the objective end 41 to the projecting end 42. Such a system may consist of an objective lens or lenses L mounted to provide focus for the system. The image picked up by the system is reflected from the surface of the identification slip or ticket S, each time the beam of light from the projector source 21 is switched on as at 14. The switch 14, actuating device 15 and batteries B may be mounted in a box 61 for transportation or like purposes, at which time the rubber tubes and wire connections are simply disconnected at their respective couplings.

In the instance of a portrait or smaller record it is important that the negative image be as small as is consistent with the identification. I therefore contemplate a system of reducing lenses L¹ and L² which will bring down the size of the identification as small as is desired. If desired, it can be made so small that a magnifying glass is used to read it.

The image of the identification data indicated at I on the slip S is first reflected in the system indicated by a prism or mirror surface or like diverting surface P disposed to deflect the incident rays as at an angle of 90° and downwardly through the vertical part 40 of the casing.

The projector end 42 of the casing, as indicated in Fig. 2, is preferably provided with a semi-flexible rubber tip 43 produced as at 44 from the convenient circular cross section of the main casing 40 to a flattened or oval form best seen in Fig. 6. This gives to the identification image incident upon the sensitized surface of the plate being used for the particular exposure then being made, a conveniently defined outline which is inconspicuous and yet the record identification is capable of being perfectly identified as a trade mark when looked for at any time of need. The form may be varied, but the flattened oval combines well with circular optics and permit any desired reduction or modification of figure.

Where the projection point on any plate is to be in other than that of its normal single exposure position, I provide for shifting the whole auxiliary identification system. This may be conveniently accomplished by mounting it upon a vertically shiftable frame 50.

In the form shown, the frame 50 is slidably supported at one end as at 51 on a rack 52 engaged by a pinion 54 on the shaft of the operating knob 53. The frame 50 carries the source of illumination 21 with its wiring 20 to any source of current, as for example, the batteries B, B. On the frame 50 I may also mount a piston 35 working the pawl 34 for the ratchet wheel 33 of the mechanism of the supplemental series I¹. The stop pin 37 on the pawl bar 38 working between the ears 39 on the frame 50 limits the motion of the pawl 34 past the ratchet wheel 33. Upon the release of the shutter bulb 12 the spring 36 retracts the pawl bar 38 actuating the auxiliary series I¹ through one step or movement to set up the next supplementary number to be photographed with the main identification I of the slip S. The piston 35 is connected by the tube 80 to the third branch.

Such apparatus is simple and its use consistent with almost any usual photographic studio practice. It combines with almost any usual identification system now used in studios and the identification obtained becomes automatically an integral and basic part of which is a new system and a new method of identification and record.

While the various uses will be apparent from the foregoing to those experienced in this art and its practices, I will trace briefly the methodical course of a system based on the principles of my invention.

From the time of the arrival of the future sitter, at which time the system identification slips S are made to the time of delivery of the finished portraits or like pictures, and as long as they last in human interest, the slip number carries the positive basic identification I.

For example, when the sitter goes to the camera a copy of the original office slip is in the hands of the operator with full information, but most important in the system, showing the identification number. The operator having observed the usual noted instructions clips the slip on the holder 30. The posing of the sitter and the necessary exposures are then made in the usual manner. The slip S can then be filed for future reference.

It may be noted in anticipation of immediately apparent difficulties that although the usual operator tests his shutter after focusing and before pulling the slide of the plate holder by one or two squeezes of his operation bulb 12, this may and usually does preferably flash the illumination source 21 of the projector. Such serves as a check and tell-tale on the readiness of the camera for its work. The desired number of exposures are then made in the usual manner.

Upon the development of the negatives the number I identifying the sitter and the general order becomes of itself a permanent record integral with each negative and each print from it. In practice, as before suggested, there are usually several poses and therefore several negatives related to the same sitting. My invention contemplates the use of serial indicia $I^1$ in connection with the main sitting or order number. These may be variously provided in addition to the key number I and as my method purposes the elimination of human error as far as possible, I provide a mechanical basis of serial addition.

As shown in Fig. 6, this may be a simple numerical progressively indicating device such as that suggested in the drawings at $I^1$.

While this, of course, actuates the serial device each time the bulb is pressed, whether for test or actual exposure, there is no difficulty involved as according to my method the sequence of the serial indicia $I^1$ is inconsequential as suggested by the skip in the serial shown in Fig. 5. Such an indicator provides a sufficient number of serials to provide for all possible exposures desired at any sitting without repeating. Whatever their occurrence, the important fact is that they appear on the negatives when made. So differentiated their identity may be recorded so that each particular negative has not only its main identifying order number, but also a serial indicative of its own status in the system.

While my method may be variously practiced and by various apparatus, I have indicated means practically adapted to studio use and therefore forming a basis for adoption for saving the expense and embarrassment of lost or unidentifiable negatives. As before suggested, my equipment may and doubtless will be variously modified to adapt it to different needs and the method of operating may likewise be made to conform to and supplement any regular or special system that any studio may have adopted for its operating or account basis.

Also, it will be understood that while I have discussed my invention from problems of the portrait studio, it may be used in almost any line of photographic activity in which such negative identity is important and convenient.

What I therefore claim and desire to secure by Letters Patent is:

1. Photographic apparatus comprising, a recording medium, a major photographic system, fixed means identifying the subject to be photographed, movable photograph-identifying means adapted to expose individual identifying indicia for each photograph of said subject, an auxiliary photographic system for photographing on said recording medium said subject-identifying means and the then exposed photograph-identifying indicia, common means for moving said photographic systems, and means synchronized with the operation of said photographic systems for operating said photograph-identifying means so that individual identifying indicia is presented for each succeeding photograph upon the operation of said photographic systems.

2. Photographic apparatus including a photographic lens, a recording medium, stationary subject-identifying indicia, movable photograph identifying indicia, an optical system for projecting the images of both said indicia on to a selected part of said recording medium, means for exposing said recording medium, means for illuminating both of said indicia, means for moving said photograph-identifying indicia, and a common control operably connected with each of said three named means, operation of said control simultaneously exposing said recording medium, illuminating said indicia and progressively moving said photograph identifying indicia.

RAEBURN WHITE.